United States Patent [19]

Yamane

[11] 4,375,748
[45] Mar. 8, 1983

[54] ENGINE SYSTEM WITH EXHAUST TURBINE SUPERCHARGER

[75] Inventor: Ken Yamane, Yokohama, Japan

[73] Assignee: Nissan Motor Co., Limited, Yokohama, Japan

[21] Appl. No.: 264,608

[22] Filed: May 18, 1981

[30] Foreign Application Priority Data

May 26, 1980 [JP] Japan ................................ 55-69784

[51] Int. Cl.³ ........................................... F02B 37/00
[52] U.S. Cl. ...................................... 60/611; 60/600; 60/601; 123/376; 123/378; 123/564
[58] Field of Search ......................... 60/600, 601, 611; 123/564, 378, 401, 382, 383, 376

[56] References Cited

U.S. PATENT DOCUMENTS

| 2,511,348 | 6/1950 | Kittler | 123/376 |
|---|---|---|---|
| 3,741,177 | 6/1973 | Schultz | |
| 3,753,427 | 8/1973 | Cedar | 123/376 |
| 4,038,819 | 8/1977 | Yoshikawa | 60/307 |
| 4,318,273 | 3/1982 | Nohira | 60/611 |

FOREIGN PATENT DOCUMENTS

| 896136 | 11/1953 | Fed. Rep. of Germany |
|---|---|---|
| 1088761 | 9/1960 | Fed. Rep. of Germany |
| 2251345 | 5/1973 | Fed. Rep. of Germany |

*Primary Examiner*—Douglas Hart
*Attorney, Agent, or Firm*—Lane, Aitken & Kananen

[57] ABSTRACT

In an engine system including an internal combustion engine and an exhaust turbine supercharger, a valve stop mechanism is provided to stop the throttle valve of the engine in an angular position anterior to the idle position thereof when the throttle valve is suddenly moved toward the idle position in the presence of an air pressure higher than a predetermined value in the air induction passageway of the engine downstream of the compressor unit of the supercharger and upstream of the throttle valve of the engine so as to preclude production of pressure surges in exhaust turbine supercharger.

4 Claims, 3 Drawing Figures

4,375,748

ENGINE SYSTEM WITH EXHAUST TURBINE SUPERCHARGER

FIELD OF THE INVENTION

The present invention relates to engine systems for, for example, automotive use and, particularly, to an engine system including the combination of an internal combustion engine and an exhaust turbine supercharger.

SUMMARY OF THE INVENTION

In accordance with the present invention, there is provided an engine system which comprises, in combination, an internal combustion engine including power cylinders, an air induction passageway leading to the power cylinders, a throttle valve positioned in the air induction passageway and rotatable about an axis fixed in the air induction passageway to and from an idle position providing a minimum degree of opening in the air induction passageway through the throttle valve and an exhaust discharge passageway leading to the power cylinders; an exhaust turbine supercharger including a compressor unit positioned in the air induction passageway of the engine and a turbine unit which is positioned in the exhaust discharge passageway of the engine for being driven by the exhaust gases discharged from the power cylinders of the engine into the exhaust discharge passageway and which is drivingly connected to the compressor unit; and a valve stop mechanism arranged in conjunction with the throttle valve of the engine and operative to stop the throttle valve in an angular position anterior to the idle position thereof when the throttle valve is turned about the aforesaid axis toward the idle position thereof in the presence of an air pressure higher than a predetermined value in the air induction passageway downstream of the compressor unit and upstream of the throttle valve.

The valve stop mechanism of the engine system thus constructed and arranged basically may comprise a valve stop member rotatable in the air induction passageway together with the throttle valve about the above mentioned axis and an actuator unit which is responsive to the pressure of air in the air induction passageway of the engine downstream of the compressor unit and upstream of the throttle valve and which comprises an actuating plunger engageable with the valve stop member and movable with the variation in the aforesaid air pressure, the actrating plunger being moved into a position effective to stop the throttle valve in an angular position anterior to the idle position thereof when the pressure of air in the air induction passageway downstream of the compressor unit and upstream of the throttle valve is higher than the aforesaid predetermined value.

BRIEF DESCRIPTION OF THE DRAWINGS

Drawbacks of a prior-art engine system using an exhaust turbine supercharger and the features and advantages of an engine system proposed by the present invention to overcome such drawbacks will be clearly understood from the following description taken in conjunction with the accompanying drawings, in which.

BACKGROUND OF THE INVENTION

An internal combustion engine is known which is equipped with an exhaust turbine supercharger. The exhaust turbine supercharger provided in such an internal combustion engine includes an exhaust turbine unit arranged in the passage of exhaust gases discharged from the power cylinders of the engine. The turbine unit is driven by the thrust energy of the exhaust gases being passed through the turbine unit and, in turn, drives a compressor unit to which the turbine unit is operatively connected through a compressor drive shaft. The compressor unit of the supercharger is positioned in the passage of the air to be fed to the air induction pipe of the internal combustion engine so that the engine is supplied with compressed air through the air induction pipe thereof. An internal combustion engine using an exhaust turbine supercharger is, thus, adapted to achieve an enhanced performance efficiency and an increased power output from the engine.

In an internal combustion engine of this nature, pulsating surges tend to be produced in exhaust turbine supercharger when the compression ratio in the compressor unit of the supercharger is increased excessively. Such pulsating surges result in production of violent impacts and vibrations in the engine system and may thus destroy or damage the bearings and impeller vanes incorporated in the supercharger. Attempts have therefore been made to preclude the pulsating surges in an exhaust turbine supercharger.

Figure 1:
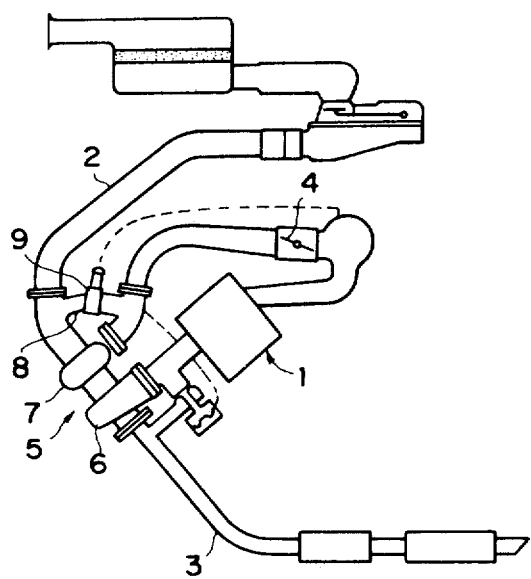
FIG. 1 is a schematic view showing, partly in section, an example of a prior-art engine system using an exhaust turbine supercharger.

One of such attempts is disclosed in an article published in "MTZ" (the issue of March, 1979; pages 107 to 111; West Germany). FIG. 1 of the drawings shows an engine system illustrated in the article.

Referring to FIG. 1, the engine system comprises an internal combustion engine 1 having an air induction pipe 2 and an exhaust pipe 3, the induction pipe 2 having a throttle valve 4 provided therein. The internal combustion engine 1 is equipped with an exhaust turbine supercharger 5 which largely consists of an exhaust-driven turbine unit 6 and a turbine-driven compressor unit 7. The turbine unit 6 is provided in an exhaust passageway leading from the power cylinders of the engine 1 to the exhaust pipe 3. The compressor unit 7 is provided in the air induction pipe 2 and is bypassed by a compressor bypass passageway 8 having a compressor bypass valve 9 provided therein.

In the prior-art engine system thus arranged generally, the turbine unit 6 is driven by the thrust energy of the exhaust gases discharged from the power cylinders of the engine 1 to the exhaust passageway leading to the turbine unit 6. The turbine unit 6 is operatively connected to the compressor unit 7 by means of a compressor drive shaft (not shown) and is operative to drive the compressor unit 7 through the shaft. The compressor unit 7 in turn is thus operative to compress the air drawn into the air induction pipe 2 from the atmosphere and to deliver compressed air to the power cylinders of the engine 1 through the throttle valve 4.

When, now, the vacuum developed in the air induction pipe 2 downstream of the throttle valve 4 is increased beyond a predetermined value with the throttle valve 4 turned into an idling position in the air induction pipe 2, the compressed air delivered from the compressor unit 7 is practically entrapped in the air induction pipe 2 between the throttle valve 4 and the compressor unit 7. In response to an increased pressure of air thus developed in the air induction pipe 2 downstream of the compressor unit 7 and upstream of the throttle valve 4, the compressor bypass valve 9 is caused to open and allows the compressed air into the air induction pipe 2 upstream of the compressor unit 7 through the compressor bypass passageway 8. With the pressure of air thus relieved from the air induction pipe 2 downstream of the compressor unit 7, production of pulsating pressure surges in the exhaust turbine supercharger is avoided.

In the meantime, analysis into the conditions responsible for the production of pressure surges in an exhaust turbine supercharger reveals that such surges tend to be produced especially when the throttle valve in the air induction pipe of the engine is closed suddenly. This is accounted for by the fact that the compressor unit can not respond promptly to the sudden closing of the throttle valve so that the compressor continues to be driven at high speeds for some time after the throttle valve is closed suddenly and the compressed air delivered from the compressor unit is entrapped in the air induction pipe upstream of the throttle valve.

In order to preclude production of pulsating pressure surges in the prior-art engine system hereinbefore described with reference to FIG. 1, therefore, it is required to enable the compressor bypass valve 9 to respond promptly to the closing motion of the throttle valve 4. It will further be preferable to have the compressor bypass passageway 8 designed in such a manner as to be capable of allowing air to flow at an increased rate when the compressor bypass valve 9 is open. The fact is however that the response characteristic of the compressor bypass valve 9 has its limitation and that the space requirement of the engine system practically prohibits designing the compressor bypass passageway to have a sufficiently ample cross sectional area. The prior-art engine system of the nature described with reference to FIG. 1 is for these reasons not fully acceptable for achieving the purpose of preventing production of pressure surges therein.

The present invention contemplates supplying the above described requirements of an engine system using an exhaust turbine supercharger by compulsorily causing the throttle valve of the air induction pipe to open in response to an increased pressure of air in the air induction pipe downstream of the compressore bypass valve even irrespective of the accelerator pedal per se. An embodiment of the engine system thus arranged in accordance with the present invention will be hereinafter described with reference to FIGS. 2 and 3 of the drawings.

DESCRIPTION OF THE EMBODIMENT

Figure 2:
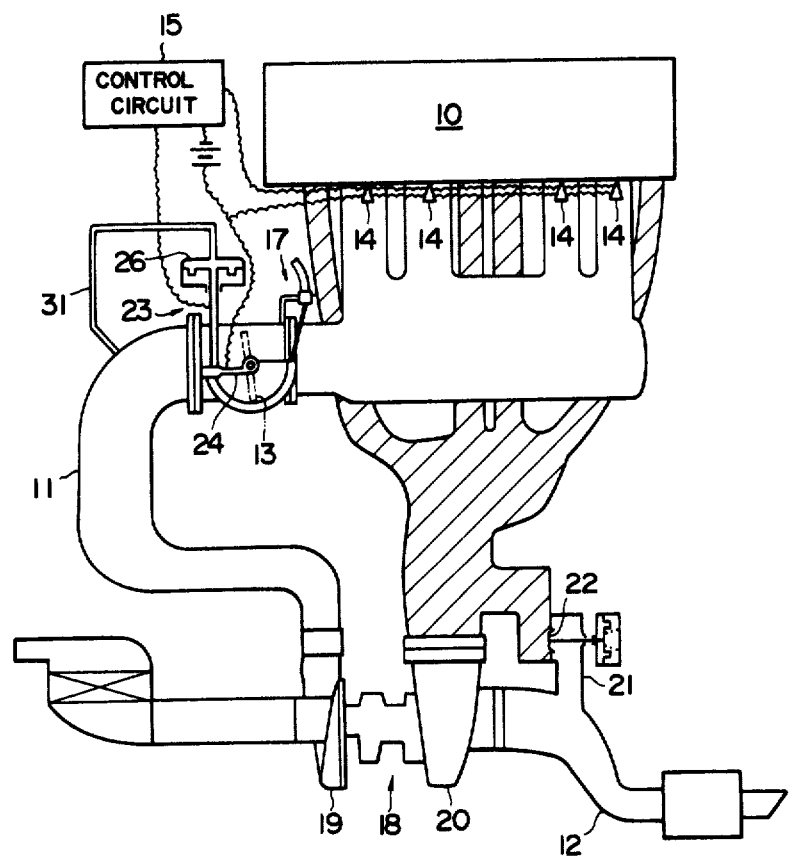
FIG. 2 is a schematic view showing, also partly in section, an embodiment of an engine system according to the present invention.

Referring first to FIG. 2 of the drawings, the engine system embodying the present invention comprises an internal combustion engine 10 having an air induction passageway 11 and an exhaust discharge passageway 12. The air induction passageway 11 has a throttle valve 13 provided therein and terminates in the respective intake ports of the individual power cylinders (not shown) of the engine 10. A solenoid-operated fuel injection valve 14 projects into each of the intake ports of the power cylinders as shown schematically. The individual fuel injection valves 14 are electrically connected to a common control circuit 15 which is adapted to control each of the fuel injection valves 14 in such a manner as to inject fuel into each of the intake ports at a rate substantially proportional to the flow of air through the air induction passageway 11.

Figure 3:
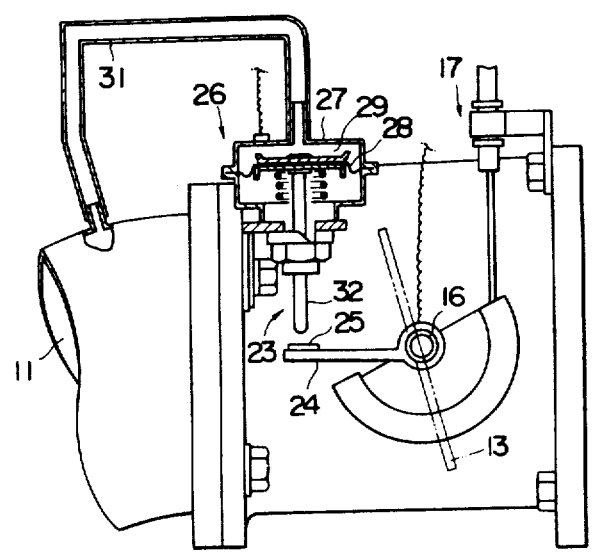
FIG. 3 is a schematic view showing, to an enlarged scale and partly in section, the construction and arrangement of the valve srop mechanism forming part of the engine system illustrated in FIG. 2.

As illustrated to an enlarged scale in FIG. 3, the throttle valve 13 provided in the air induction passageway 11 is mounted on a throttle valve shaft 16 and is operatively connected to an accelerator pedal (not shown) by means of a suitable throttle actuating linkage which is partially indicated at 17. The throttle actuating linkage 17 thus interconnecting the throttle valve 13 and the accelerator pedal may be of the type well known in the art and is adapted to turn the throttle valve 13 about the center axis of the shaft 16 between a full throttle position allowing the air induction passageway 11 to be fully open through the valve 13 and an idle position providing a minimum degree of opening in the passageway 11 through the valve 13. As is well known in the art, the throttle valve 13 is biased to turn toward the idle position thereof by biasing means (not shown) included in or associated with the throttle actuating linkage 17.

Reverting to FIG. 2 of the drawings, the engine system embodying the present invention further comprises an exhaust turbine supercharger 18 which is largely composed of a compressor unit 19 and a turbine unit 20. The compressor unit 19 is provided in the air induction passageway 11 upstream of the throttle valve 13. On the other hand, the turbine unit 20 is provided in the exhaust discharge passageway 12 and is drivingly connected to the compressor unit 19 by means of a compressor drive shaft (not shown). The turbine unit 20 is bypassed by a turbine bypass passageway 21 leading from the exhaust discharge passageway 12 upstream of the turbine unit 20 to the exhaust discharge passageway 12 downstream of the turbine unit 20. In the turbine bypass passageway 21 is provided a bypass control valve 22 responsive to the pressure of air in the air induction passageway 11 downstream of the compressor unit 19 and upstream of the throttle valve 13. The bypass control valve 22 is operative to open the turbine bypass passageway 21 and permit the flow of exhaust gases to bypass the turbine unit 20 when the pressure of air in the air induction passageway 11 downstream of the compressor unit 19 and upstream of the throttle valve 13 is higher than a predetermined value. The turbine bypass passageway 21 and the bypass control valve 22 are thus adapted to limit the amount of thrust energy to be imparted to the turbine unit 20 and accordingly the amount of work on the compressor unit 19 under high load conditions of the internal combustion engine 10. The arrangement including the turbine bypass passageway 21 and the bypass control valve 22 above described is provided merely by preference and may therefore be omitted from the engine system according to the present invention.

The engine system embodying the present invention further comprises a valve stop mechanism 23 which is operative to stop the throttle valve 13 in an angular position anterior to the idle position thereof when the throttle valve 13 is moved toward the idle position in the presence of an air pressure higher than a predetermined value in the air induction passageway 11 downstream of the compressor unit 19 and upstream of the throttle valve 13.

In FIGS. 2 and 3 of the drawings, the valve stop mechanism 23 to achieve such a function is shown comprising a valve stop member 24 mounted on the throttle valve shaft 16 and rotatable with the throttle valve 13 about the center axis of the shaft 16. The valve stop member 24 extends radially away from the shaft 16 and has an electric contact element 25 securely attached thereto adjacent the leading end of the member 24. The valve stop mechanism 23 shown in FIGS. 2 and 3 further comprises a diaphragm-operated actuator unit 26 which is positioned in the neighbourhood of the valve stop member 24.

The diaphragm-operated actuator unit 26 in turn comprises a hollow casing 27 which is internally divided by a flexible diaphragm 28 into two variable-volume chambers one of which constitutes an air chamber 29. The air chamber 29 is hermetically isolated from the other of the chambers in the casing 27 by the diaphragm 28 which is secured along its outer perimeter to the casing 27 as will be better seen from FIG. 3. The diaphragm 28 is urged to move and deform in a direction to contract the air chamber 29 by suitable biasing means which is shown comprising a helical compression spring 30 provided within the chamber opposite to the air chamber 29 in the casing 27. The air chamber 29 is in constant communication with the air induction passageway 11 downstream of the compressor unit 19 and upstream of the throttle valve 13 through the passageway in an air feed conduit 31 leading from the air induction passageway 11 to the air chamber 29. In the presence of compressed air in the air unduction passageway 11 downstream of the compressor unit 19 and upstream of the throttle valve 13, the compressed air is directed through the passageway in the air feed conduit 31 into the air chamber 29 and causes the diaphragm 28 to move and deform in a direction to expand the air chamber 29 against the force of the spring 30.

The diaphragm-operated actuator unit 26 of the engine system embodying the present invention further comprises an actuating plunger 32 secured at one end to the diaphragm 28 and longitudinally extending from the diaphragm 28 through the chamber opposite to the air chamber 29. The actuating plunger 32 longitudinally projects outwardly from the casing 27 toward the contact element 25 on the above described valve stop member 24 so as to be engageable at its leading end with the contact element 25.

The compression spring 30 is selected such that the force thereof is to be overcome by the force resulting from the pressure of air acting on the diaphragm when the air pressure is higher than a predetermined value. When the pressure of air in the air induction passageway 11 downstream of the compressor unit 19 and upstream of the throttle valve 13 is higher than the predetermined value, the diaphragm 28 is forced to move and deform in the direction to expand the air chamber 29 against the force of the spring 30 with the result that the actuating plunger 32 is caused to longitudinally protrude toward the contact element 25 on the valve stop member 24. The predetermined value of the air pressure thus causing the actuating plunger 32 to protrude toward the contact element 25 on the valve stop member 24 may be of the order of 50 percent of the maximum value of the pressure of the compressed air to be delivered from the compressor unit 19. The actuating plunger 32 is constructed of an electrically conductive material so that electrical connection is established between the plunger 32 and the contact element 25 on the valve stop member 24 when the contact element 25 and the actuating plunger 31 are brought into engagement with each other. The contact element 25 and the actuating plunger 32 are electrically connected to the common control circuit 15 which is adapted to cut off the supply of fuel to each of the fuel injection valves 14 of the individual power cylinders of the engine when electrical connection is provided in the contact element 25 and the plunger 32 under conditions in which the engine 10 is operating at a speed higher than a predetermined value (which may be approximately 1,000 rpm by way of example).

When, now, the internal combustion engine 10 is operating under high load conditions with the throttle valve 13 wide open, exhaust gases are discharged at high rates from the power cylinders of the engine 10 and drive the turbine unit 20 of the exhaust turbine supercharger 18 with a large amount of thrust energy. It therefore follows that the compressor unit 19 of the supercharger 18 is driven almost to its full capacity by means of the turbine unit 20 so that the pressure of the compressed air delivered from the compressor unit 19 is higher than the above mentioned predetermined value thereof. Under these conditions, the diaphragm 28 of the actuator unit 26 is forced to move and deform in the direction to expand the air chamber 29 against the force of the spring 30 and causes the actuating plunger 32 to longitudinally protrude toward the contact element 25 on the valve stop member 24. The valve stop member 24 rotatable with the throttle valve 13 on the shaft 16 is however held in an angular position having the contact element 25 spaced apart from the leading end of the actuating plunger 32 since the throttle valve 13 is held in the full throttle position thereof or at least in an angular position close to the full throttle position. The valve stop member 24 being thus disengaged from the plunger 32, the throttle valve 13 is permitted to turn toward or away from the full throttle position thereof when the throttle valve 13 is driven to turn about the center axis of the shaft 16 by means of the accelerator pedal operatively connected to the valve 13 through the throttle actuating linkage 17. If the pressure of the compressed air delivered from the compressor unit 19 exceeds a value which is predetermined for the bypass control valve 22 in the turbine bypass passageway 21 (FIG. 2), the bypass control valve 22 is made open to permit exhaust gases to bypass the turbine unit 20. Under these conditions, the exhaust gases emitted from the engine 10 are at least partially discharged to the open air without being passed through the turbine unit 20 of the supercharger 18. As a consequence, the compressor unit 19 of the supercharger 18 is driven by a reduced driving power and is accordingly caused to reduce the pressure of the compressed air being delivered therefrom, precluding an occurrence of unusual combustion causing knocking or the like in each of the power cylinders of the engine 10.

When the throttle valve 13 is suddenly caused to turn from the full throttle position or any angular position close to the full throttle position toward the idle position thereof with the accelerator pedal released, the supercharger 18 can not promptly follow the closing of the throttle valve 13 so that the pressure of the compressed air delivered from the compressor unit 19 is maintained unchanged or slightly increases for a short while after the throttle valve 13 is turned toward the idle position thereof. For a certain period of time after the throttle valve 13 is moved into the idle position thereof, the actuating plunger 32 of the diaphragm-operated actuator unit 26 is for this reason held in the longitudinal position outwardly protruded from the casing 27 toward the contact element 25 on the valve stop member 24. When the throttle valve 13 being turned toward the idle position thereof reaches a certain angular position anterior to the idle position, the valve stop member 24 or more exactly the contact element 25 on the valve stop member 24 is brought into abutting engagement with the actuating plunger 32 held in the above mentioned longitudinal position so that throttle valve 13 is forcibly brought to a stop in the particular angular position anterior to the idle position thereof, providing a certain degree of opening through the throttle valve 13 in the air induction passageway 11. The compressed air delivered from the compressor unit 19 of the supercharger 18 is thus allowed to flow at a limited rate past the throttle valve 13 toward the power cylinders of the engine 10 so that the compressor unit 19 is assured to pass air therethrough at a rate higher than a certain value which is dictated primarily by the opening degree of the throttle valve 13. If, thus, the opening degree of the throttle valve 13 which is brought to a stop by means of the actuating plunger 32 as above described is selected in such a manner that the flow rate of the air to be allowed to pass through the compressor unit 19 in response to such an opening degree is sufficient to avoid production of pressure surges in the exhaust turbine supercharger, no pressure surges will be produced in the exhaust turbine supercharger even when the rotor in the compressor unit 19 is rotating at a high speed by the force of inertia.

When the contact element 25 on the valve stop member 24 is brought into engagement with the actuating plunger 32, electrical connection is established between the contact element 25 and the actuating plunger 32 which is constructed of an electrically conductive material. If, in this instance, the engine 10 is operating at a speed higher than a predetermined value, the control circuit 15 to which the contact element 25 and the plunger 32 are electrically connected operates to cut off the supply of fuel to each of the fuel injection valves 14 of the individual power cylinders of the engine 10 as previously discussed. This is useful not only for saving fuel during deceleration of a vehicle but also for avoiding deterioration of the engine braking performance as would otherwise be caused by the throttle valve 13 which is not permitted to be turned into the idle position during deceleration of the vehicle, when the engine system is used on an automotive vehicle.

If the pressure of the compressed air delivered from the compressor unit 19 is reduced below the previously mentioned predetermined value thereof upon lapse of a certain period of time after the throttle valve 13 is turned toward the idle position thereof with the accelerator pedal released, the force resulting from the pressure of air acting on the diaphragm 28 of the actuator unit 26 is overcome by the opposing force of the spring 30. When this occurs, the diaphragm 28 is caused to move and deform in the direction to contract the air chamber 29 by the force of the spring 30 so that the actuating plunger 32 retracts from the protruded longitudinal position thereof and allows the throttle valve 13 to reach the idle position thereof by the force of the previously mentioned biasing means included in or associated with the throttle actuating linkage 17.

As will have been appreciated from the foregoing description, the engine system embodying the present invention is characterized, among other things, by the arrangement in which the motion of the throttle valve 13 being suddenly turned toward the idle position thereof is compulsorily interrupted when the throttle valve 13 reaches a certain angular position anterior to the idle position. Production of pulsating pressure surges in the exhaust turbine supercharger can thus be precluded with certainty without involving no such problem that is related to the response characteristic of the compressor bypass valve or to the flow rate of air available in the compressor bypass passageway provided in a prior-art engine system of the nature described with reference to FIG. 1 of the drawings.

What is claimed is:

1. An engine system comprising, in combination,
    an internal combustion engine including power cylinders, an air induction passageway leading to said power cylinders, a throttle valve positioned in said air induction passageway and rotatable about an axis fixed in said air induction passageway to and from an idle position providing a minimum degree of opening in said air induction passageway through said throttle valve and an exhaust discharge passageway leading from said power cylinders;
    an exhaust turbine supercharger including a compressor unit positioned in said air induction passageway and a turbine unit which is positioned in said exhaust discharge passageway for being driven by the exhaust gases discharged from said power cylinders into the exhaust discharge passageway and which is drivingly connected to said compressor unit; and
    a valve stop mechanism arranged in conjunction with said throttle valve and operative to stop said throttle valve in an angular position anterior to said idle position thereof when said throttle valve is turned about said axis toward said idle position thereof in the presence of an air pressure higher than a predetermined value in said air induction passageway downstream of said compressor unit and upstream of said throttle valve.

2. An engine system as set forth in claim 1, in which said valve stop mechanism comprises a valve stop member rotatable in said air induction passageway together with said throttle valve about said axis and an actuator unit which is responsive to the pressure of air in said air induction passageway downstream of said compressor unit and upstream of said throttle valve and which comprises an actuating plunger engageable with said valve stop member and movable with the variation in said pressure of air, said actuating plunger being moved into a position effective to stop said throttle valve in an angular position anterior to said idle position thereof when the pressure of air in said air induction passageway downstream of said compressor unit and upstream of said throttle valve is higher than said predetermined value.

3. An engine system as set forth in claim 2, in which said actuator unit further comprises a hollow casing, a flexible diaphragm secured to said casing for forming a variable-volume air chamber in said casing, passageway means providing constant communication between said air chamber and said induction passageway downstream of said compressor unit and upstream of said throttle valve, and biasing means urging said diaphragm to move and deform in a direction to contract said air chamber, said actuating plunger longitudinally projecting from said diaphragm toward said valve stop member.

4. An engine system as set forth in claim 2 or 3, in which said actuator unit further comprises an electric contact element attached to said valve stop member and in which said actuating plunger is constructed of an electrically conductive material so that electrical connection is provided between said actuating plunger and said contact element when said contact element and said actuating plunger are brought into engagement with each other.

* * * * *